United States Patent [19]

Kawamoto

[11] Patent Number: 5,516,571
[45] Date of Patent: May 14, 1996

[54] HONEYCOMB-LIKE REGENERATIVE BED ELEMENT

[75] Inventor: Masao Kawamoto, Yokohama, Japan

[73] Assignee: Nippon Furnace Kogyo Kaisha, Ltd., Yokohama, Japan

[21] Appl. No.: 115,344

[22] Filed: Sep. 1, 1993

[51] Int. Cl.$^6$ ........................................ B32B 3/12
[52] U.S. Cl. ........................ 428/116; 428/118; 428/188
[58] Field of Search ........................... 428/116, 118, 428/188; 502/527; 126/91 A

[56] References Cited

U.S. PATENT DOCUMENTS

| | | | |
|---|---|---|---|
| 3,983,283 | 9/1976 | Bagley | 428/116 |
| 4,304,585 | 12/1981 | Oda et al. | 428/116 X |
| 4,448,833 | 5/1984 | Yamaguchi et al. | 428/116 |
| 4,740,408 | 4/1988 | Mochida et al. | 428/116 |
| 4,856,492 | 8/1989 | Kawamoto | 428/116 X |
| 4,870,947 | 10/1989 | Kawamoto | 126/91 A |
| 5,098,455 | 3/1992 | Doty et al. | 428/116 X |
| 5,304,059 | 4/1994 | Tanaka et al. | 126/91 A X |

*Primary Examiner*—Henry F. Epstein
*Attorney, Agent, or Firm*—Notaro & Michalos

[57] ABSTRACT

A honeycomb-like regenerative bed element having an infinite number of cells, characterized in that the following formula is given:

$$f=(1-\beta)\beta^3$$

wherein $\beta$ is an opening ratio of the regenerative bed element, $$\beta=(P-T)^2/P^2$$

P is a pitch of the cells, which is a distance between one center of gravity in one cell and another center of gravity in another cell, the distance extending across a common cell wall perpendicular thereto, and T is a thickness of wall of each of the cells, and that the P and T are set at a maximum value obtained by the formula f or set within a range of values close to that maximum value.

P/T ratio, namely, a ratio between P and T may be set at 7.5 or within a range of values from 5 to 10 on the basis of the formula f so as to obtain an optimal conditions for the regenerative bed element.

The regenerative bed element is formed from a ceramics material.

4 Claims, 3 Drawing Sheets

HONEYCOMB-LIKE REGENERATIVE BED ELEMENT

BACKGROUND OF INVENTION

1. Field of the Invention

The present invention relates to a honeycomb-like regenerative bed element. More particularly, the present invention is directed to a honeycomb-like regenerative bed element having an infinite number of honeycomb-like cells or through-bores formed therein, which is suited for use in a waste heat recovery system provided in a combustion device of a regenerative heating type, such as a regenerative-heating-type radiant tube burner or a regenerative-heating-type open flame burner (i.e. a direct firing regenerative burner, and also may be suited for use in the so-called high-frequency heat regeneration system that repeats the cycle of heat storage and heat emission in a short period, for example, 20 sec. to 60 sec.

It should be understood that the honeycomb-like regenerative bed element mentioned herein is not limited to the one having an infinite number of hexagonal cells by its name, but inclusive of other regenerative bed elements having other and different shapes of cells, such as square cells or triangular cells. 2. Description of Prior Art In recent years various combustion air preheating techniques have been developed in the field of combustion devices, which recover a substantial amount of heat quantity from an exhaust gas, with a view to increasing thermal efficiency. For instance, although not shown, there has been an alternate combustion type radiant tube burner available, which has regenerative bed element (see Industrial Heating, P 71, Vol. 23, No. 6, Issued by the Japan Industrial Furnace Manufacturers Association, and the U.S. Pat. No. 4,856,492 and 4,870,947). According thereto, a pair of burners are provided at both ends of a radiant tube, respectively, for alternate combustion purposes, and one of a pair of regenerative bed elements is provided equipped at each of those two burners. Hence, a combustion gas is exhausted through the non-operated burner and associated regenerative bed element, while combustion takes place in the operated burner, and then, heat stored in that regenerative bed element is used for preheating combustion air.

With regard to the regenerative bed element, it was attempted to obtain an optimal structure which meets a high waste heat recovery and high thermal efficiency in this field of burner technique.

For example, an attempt was made to utilize a conventional heat storage brick, metallic regenerative materials, or the like, which have been used in industrial furnaces for steel manufacturing or the ceramics industry, as a regenerative means for recovering a sensible heat. In general, a suitable regenerative bed element may be formed by the heat storage bricks of about 6 cm thickness in a grid or cross stripe pattern, or by use of pure metal materials of about 2–3 cm thickness. But, it has recently been proposed to adopt ceramics balls, like an alumina ball, as the regenerative bed element.

The use of such heat storage brick and metallic regenerative materials, however, has been found unsuitable for the reason that the brick is slow in absorbing and emitting heat, requiring some tens of minutes or some hours to repeat the cycle of heat storage and emission and resulting in a low average temperature and a poor thermal efficiency, further the metallic regenerative materials can not be used with such an oxidizable gas as exhaust combustion gas and a high-temperature combustion gas of over 1000° C. because of heat resistance restrictions, despite being suited for the high-frequency regenerative operation (which repeats the cycle of heat storage and emission in a short period of time, as short as 20 to 60 sec.). Consequently, the brick is so great in volume for heat storage as to need a sufficient long time for storing therein or emitting therefrom heat, which is not suited for the rapid heat storage/emission cycle, and the metallic regenerative material can not be used in the high-temperature and oxidation circumstances.

In order to solve the foregoing problems, an attempt was made find the most suitable material which has great specific surface area and heat resistance, and not reactive with a combustion gas. Honeycomb-like ceramics provide an answer to this demand, and in particular, a catalytic ceramics for decreasing NOx in exhaust gas of an automobile was found to be applicable.

None the less, the usefulness of catalytic ceramics resides primarily in having a large surface area to bear therein as much catalyzer as possible, with the result that a person in the art can attempt to make the walls of cells in the ceramics thinner to a minimum degree in order to attain the smallest possible pitch of the cell. But, this structure will increase draft resistance. Thus, the catalytic ceramics, which may work in a high-pressure-ratio engine of an automobile without substantial problem, will raise a problem of pressure loss, if it is applied to the burners or similar combustion devices, such pressure loss is also critical and unsuitable for a regenerative bed element used in combustion devices. One can consider reducing such draft resistance (i.e. pressure loss) by Increasing the cell pitch while maintaining the thickness of cell wall so as to enhance the draft efficiency, but as a result, the storage heat capacity will be reduced. Consequently, the automotive catalytic ceramics is not always best applicable to the regenerative bed element.

For various reasons, it has been difficult to achieve a compact or small-sized regenerative bed element with a small draft resistance and a sufficiently large degree of storage heat capacity and area of heat transfer surfaces. Namely, attempts to obtain the most preferred structure of honeycomb-like regenerative bed element suited for the burners or other similar combustion devices have been unsuccessful.

SUMMARY OF THE INVENTION

In view of the above-stated drawbacks, it is thus a purpose of the present invention to provide a novel honeycomb-like regenerative bed element which meets optimal conditions requiring a small draft resistance, yet provides a large storage heat capacity and a large area of heat transfer surfaces.

In order to accomplish such purpose, the inventor contemplates providing an effective structure of such optimal honeycomb-like regenerative bed element, using a ceramics material, which may not only be applied to the one having a great number of hexagonal cells, but also be applied to another having various shapes of cells, such as rectangular cells or triangular cells.

Namely, the inventor firstly finds that the foregoing optimal conditions are defined as follows:

(i) Vc/V ratio should be large, wherein "V" refers to a gross volume, including cell volume, of the honeycomb-like regenerative bed element, and "Vc" refers to a storage heat capacity of the same (an actual volume thereof for storing a heat). In other words, the storage heat capacity Vc should be large per unit gross volume V in the regenerative bed element, so that a great quantity of heat may be stored in a compact or small-sized body of the regenerative bed element.

(ii) At/V ratio should be large. Namely, the area "At" of the inner surfaces or heat transfer surfaces of cell should be large per unit gross volume "V" of the regenerative bed element. Therefore, the larger the area "At" of the cell heat transfer surfaces is with respect to a certain heat capacity (Vc), the faster a speed for storing a certain quantity of heat will be, thereby realizing a high response to the heat. It is desirable to make the heat storage and heat emission of the element occur rapidly. (This may advantageously allow the high-frequency regenerative operation.)

(iii) A draft resistance, or pressure loss, "ΔP" per unit gross volume "V" of the regenerative bed element should be small. Namely, the pressure loss (ΔP) in a combustion system using this regenerative bed element should be small.

Secondly, with regard to the cells of the regenerative bed element, let us define a cell pitch to be "P", a distance between one center of gravity in one cell and another center of gravity in another adjacent cell, which extends across their common cell wall perpendicular thereto, and further let us define a thickness of cell wall to be "T". Then, the inventor finds that an opening ratio β of the regenerative bed element can be expressed by the following formula: $\beta=(P-T)^2/P^2$. On the basis of this formula, the inventor has developed a calculation as below.

The foregoing storage heat capacity ratio Vc/V is expressed as follows:

$$Vc/V = 1-\beta \quad (1)$$

The foregoing ratio At/V for the heat transfer surface area of cell per unit volume is expressed as follows:

$$At/V = 40(P-T)/P^2 (cm^2/cm^3)$$

$$\propto (P-T)/P^2 = \{1/(P-T)\}\beta \quad (2)$$

The foregoing pressure loss ΔP is expressed by the following formula:
ti $\Delta P = \lambda \cdot (\gamma/2g) \cdot v^2 \cdot L/de + tm$ (3)

Then, the pressure loss reciprocal per unit gross cross-sectional area of the regenerative bed element is expressed as follows:

$$1/\Delta P \propto \beta^2 \cdot de \propto \beta^2(P-T) \quad (4)$$

Hence, the reciprocal 1/ΔP may be expressed by $\beta^2(P-T)$.

Accordingly, on the basis of the formulas (1), (2) and (3) above, we can obtain the following expression as an evaluation function or formula for evaluating the above-noted optimal conditions (i), (ii), and (iii).

$$\begin{aligned} f &= (Vc/V) \times (At/V) \times (1/\Delta P) \quad (5) \\ &= (1-\beta) \times \{\beta/(P-T)\} \times (P-T)\beta^2 \\ &= (1-\beta) \times \beta^3 \end{aligned}$$

Namely, when the formula or function (5) gives a maximum value, the conditions (i), (ii), and (iii) become optimal or best. Thus, turning back to the cell pitch P and cell wall thickness T, the inventor considered a relation between those two cell factors and the foregoing formula (5) under the state where formula (5) gives a maximum value. The formula "f" (5) gives a maximum value when the P/T ratio is 7.5. Accordingly, if a certain value of T (i.e. cell wall thickness) is determined, a corresponding value of P (i.e. cell pitch) may be obtained by multiplying that value of T by 7.5, whereupon all the optimal conditions (i), (ii) and (iii) may be satisfied for the regenerative bed element R. It is also understood that, insofar as the P/T ratio falls within the range of 5 to 10, good conditions close to those three optimal conditions may be achieved.

In accordance with the present invention, therefore, a desired shape of cells can be formed in the regenerative bed element R on the basis of a ratio between the cell pitch and cell wall thickness.

DETAILED DESCRIPTION OF PREFERRED EMBODIMENTS OF THE INVENTION

In consideration of the drawbacks of the previously stated prior art, the inventor of the present invention now presents a novel honeycomb-like regenerative bed element which meets the optimal conditions permitting high-frequency regenerative operation in the waste heat recovery system, and requiring a small draft resistance, yet providing a large storage heat capacity and a large area of heat transfer surfaces. Further, the inventor provides an effective structure of such optimal honeycomb-like regenerative bed element that may not only be applied to the one having a great number of hexagonal cells, but may also be applied to other various shapes of cells, such as rectangular cells or triangular cells.

It is to be noted here that the term, "cells", used herein, has the meaning of through-bores defined and partitioned by a great number of walls within the regenerative bed element, the through-bores penetrating through the regenerative bed element in the longitudinal direction thereof.

Here are three more specific points found by the inventor in terms of the foregoing optimal conditions, which will be used later for further description:

(i) Vc/V ratio should be large, wherein "V" refers to a gross volume, including cell volume, of the honeycomb-like regenerative bed element, and "Vc" refers to a storage heat capacity of the same (an actual volume thereof for storing a heat). The gross volume including cell volume will be referred to as "gross volume", hereinafter. In other words, the storage heat capacity Vc should be large per unit gross volume V in the regenerative bed element, so that a great quantity of heat may be stored in a compact or small-sized body of the regenerative bed element.

(ii) At/V ratio should be large. Namely, the area "At" of the inner heat transfer surfaces of cell should be large per unit gross volume "V" of the regenerative bed element. Therefore, the larger the area "At" of the cell heat transfer surfaces is with respect to a certain heat capacity (Vc), the faster a speed for storing a certain quantity of heat will be, thereby realizing a high response to the heat. It is desirable to make the heat storage and heat emission of the element occur rapidly. (This may advantageously allow the high-frequency regenerative operation.)

(iii) A draft resistance, or pressure loss, "ΔP" per unit gross volume "V" of the regenerative bed element should be small. Namely, the pressure loss (ΔP) in a combustion system using this regenerative bed element should be small.

The foregoing three conditions may apply to most other regenerative bed elements, irrespective of the shape of cells.

Now, in order to describe the inventive concept of the present invention meeting the above-noted conditions, first, an "opening ratio" of the honeycomb-like regenerative bed element will be explained, with reference to FIG. 1 and FIGS. 2(A) to 2(C).

Figure 1:
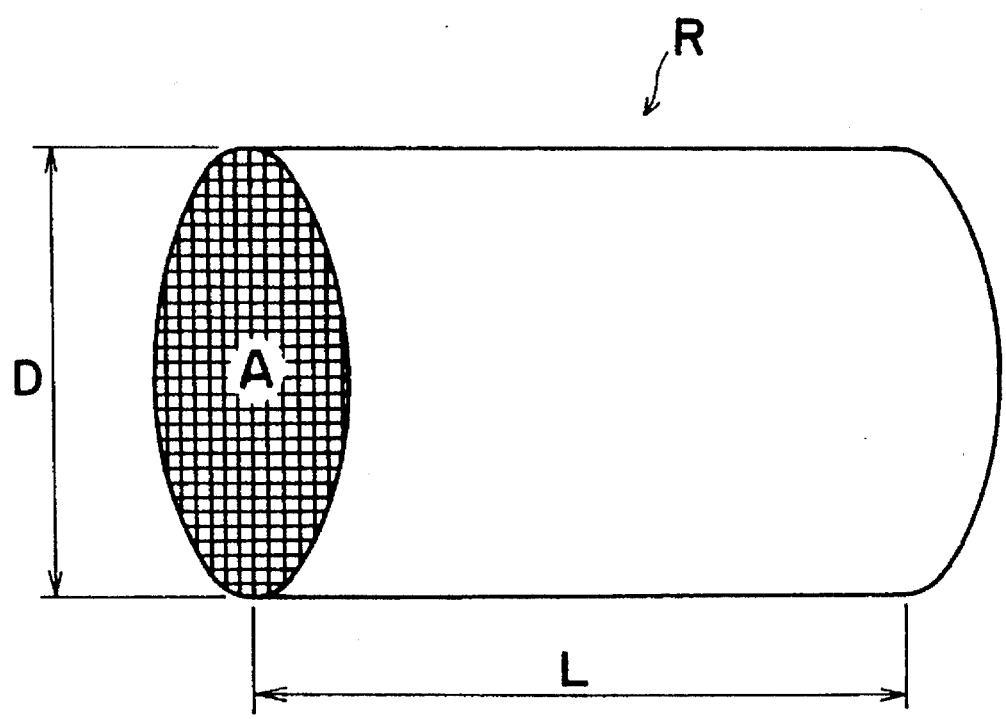
FIG. 1 is a schematic perspective view showing one example of a honeycomb-like regenerative bed element in accordance with present invention.
Figure 2A:
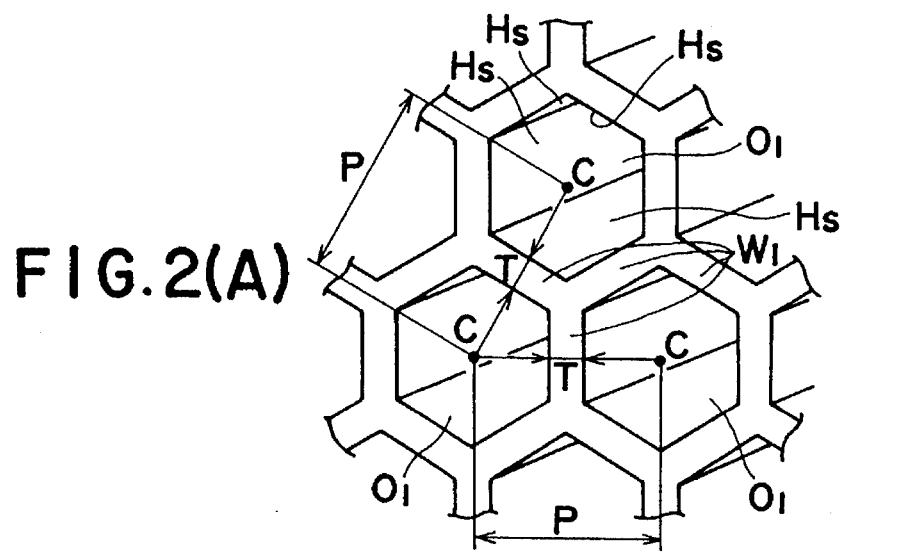
FIG. 2(A) is a schematic diagram illustrating the structure of regular hexagonal cells formed in the honeycomb-like regenerative bed element.
Figure 2B:
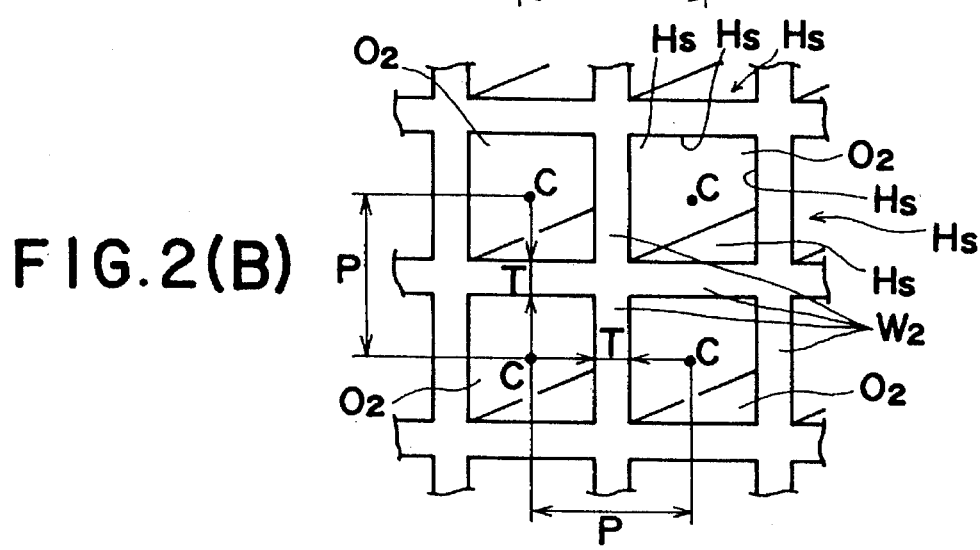
FIG. 2(B) is a schematic diagram illustrating the structure of square cells formed in the honeycomb-like regenerative bed element.
Figure 2C:
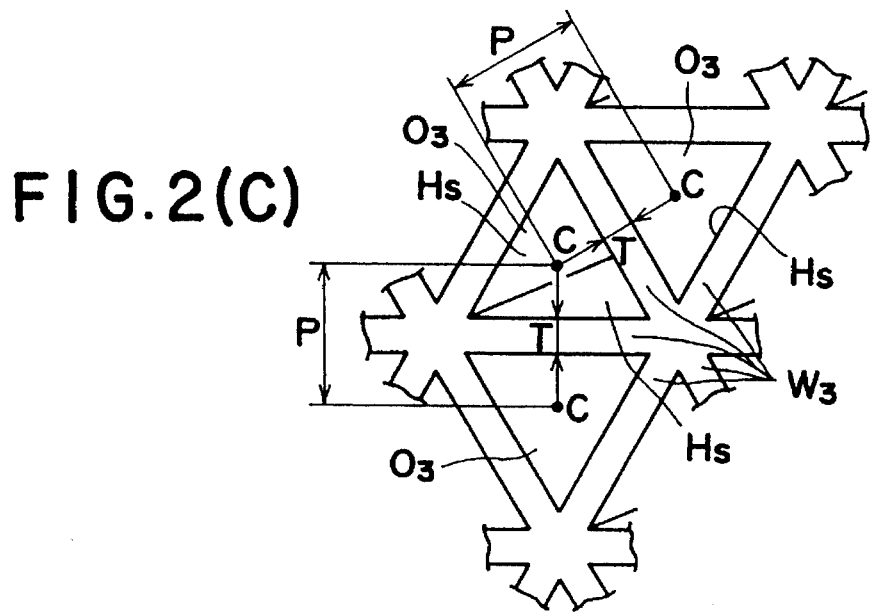
FIG. 2(C) is a schematic diagram illustrating the structure of equilateral triangular cells formed in the honeycomb-like regenerative bed element.

FIG. 1 schematically shows a cylindrical shape of honeycomb-like regenerative bed element R made of a ceramics material, which has an infinite number of cells (see the cells $O_1$, $O_2$ or $O_3$ respectively shown in FIGS. 2(A), 2(B) and 2(C) perforated therethrough in the longitudinal direction thereof. Designations D and L denote an outer diameter and a length, of the regenerative bed element R, respectively. Further, designation A represents a substantially hollow cross-sectional area of the regenerative bed element R. Here, the terminology, "substantially hollow cross-sectional area", is generally defined to mean the cross-sectional area of the element R which is substantially occupied by hollow portions or the cells. Strictly stated, since it is seen from FIG. 1 that a great number of cells are formed in the cross-sectional surface of the element R, the "substantial hollow cross-sectional area A" is now defined to mean a gross cross-sectional area obtained from a total cross-sectional area of the cells ($O_1$, $O_2$ or $O_3$) plus a total cross-sectional area of their respective walls ($W_1$, $W_2$ or $W_3$) which form cell walls partitioning those cells within the element R.

It is noted that the aforementioned "heat transfer surface of cell" is designated by HS as in FIGS. 2(A) to 2(C), which refers to the inner surfaces of each cell wall ($W_1$, $W_2$ or $W_3$) surrounding the respective cell ($O_1$, $O_2$ or $O_3$).

FIG. 2(A) shows an example where a plurality of regular hexagonal cells $O_1$ are formed in the element R. Also, FIGS. 2(B) and 2(C) respectively show the formation of square cells and equilateral triangular cells $O_3$ in the same element R.

As shown, a cell pitch P is defined with respect to each of those different cells $O_1$, $O_2$ and $O_3$. The cell pitch P is a distance between one center of gravity C in one cell and another center of gravity C in another adjacent cell, which extends across their common cell wall ($W_1$, $W_2$ or $W_3$) perpendicular thereto. Designation T denotes the thickness of each cell wall ($W_1$, $W_2$ or $W_3$).

In actual use of the regenerative bed element R, a fluid flows through the cells ($O_1$, $O_2$ or $O_3$); the cells per se form plural passages through which the fluid will flow. Thus, it is appropriate to mention that the ratio of such fluid passages present in the element R is an "opening ratio" of the same. Accordingly, let us consider such opening ratio in terms of cell unit. That is, let us define a ratio of fluid passages which occupies the cross-sectional area of one single cell ($O_1$, $O_2$ or $O_3$) including the associated cell wall ($W_1$, $W_2$ or $W_3$), and further let us regard such fluid passage ratio as an "opening ratio β" of the regenerative bed element R. Then, that cell opening ratio β may be obtained by the following formula in general, regardless of the shape of cell.

$$\beta = (P-T)^2/P^2$$

Hence, the foregoing storage heat capacity ratio Vc/V is expressed as follows:

$$Vc/V = 1 - \beta \tag{1}$$

Thus, the foregoing ratio At/V concerning the area of cell heat transfer surfaces HS is expressed as follows:

$$At/V = 40(P-T)/P^2 (cm^2/cm^3)$$

$$\propto (P-T)/P^2 = \{1/(P-T)\}\beta \tag{2}$$

wherein 40 is a constant. Accordingly, At/V may be expressed by $\{1/(P-T)\}\beta$.

The foregoing pressure loss ΔP is expressed by the following formula:

$$\Delta P = \lambda \cdot (\gamma/2g) \cdot v^2 \cdot L/de \tag{3}$$

wherein,

λ is a coefficient of friction,

γ is a specific weight of fluid ($kg/m^3$), v is a flow velocity of fluid (m/sec.), g is a gravitational acceleration (9.8$m/sec^2$) and de is an equivalent diameter of cell of the regenerative bed element R (mm).

The flow velocity of fluid v above is:

$$v = G/3600 A_R \tag{4}$$

wherein,

G is a flow quantity of fluid ($m_3$/H), and $A_R$ is a cross-sectional area of cell of the regenerative bed element R ($m_2$).

The cross-sectional area $A_R$ of cell above is expressed as follows:

$$A_R = \beta A \tag{5}$$

The equivalent diameter "de" of cell is expressed as follows:

$$de = \sqrt{(4/\pi)(P-T)^2} \tag{6}$$

wherein, 4/π is a constant. It is noted here that the equivalent diameter means a diameter of a circular cell having a cross-sectional area equal to that of any cell having any shape of sectional area. And, for example, in each of the three embodiments shown in FIGS. 2(A) to 2(C), the respective equivalent diameters may be obtained as follows, supporting the general formula (6) above. (The cross-sectional area of equivalent circle is expressed by $(\pi/4)de^2$.)

In FIG. 2(A), as the cross-sectional area of regular hexagonal cells $O_1$ is obtainable by $(\sqrt{3}/2)(P-T)^2$ we can therefore express de as below.

$$(\sqrt{3}/2)(P-T)^2 = (\pi/4)de^2$$

$$\therefore de = \sqrt{(2\sqrt{3}/\pi)(P-T)^2}$$

In FIG. 2(B), as the cross-sectional area of square cells $O_2$ is obtainable by $(P-T)^2$, we can therefore express de as below.

$$(P-T)^2 = (\pi/4)de^2$$

$$\therefore de = \sqrt{(4/\pi)(P-T)^2}$$

In FIG. 2(C), as the cross-sectional area of equilateral triangular cells $O_3$ is obtainable by $(P-T)$, we can therefore express de as below.

$$(3\sqrt{3}/4)(P-T)^2 = (\pi/4)de^2$$

$$\therefore de = \sqrt{(3\sqrt{3}/\pi)(P-T)^2}$$

Now, let us expand the aforementioned formula (3) on the pressure loss $\Delta P$ hereinafter, in terms of its reciprocal.

Firstly, by rearranging the formula (3) and deleting the constant $4/\pi$ therefrom, we can define a reciprocal of the pressure loss $\Delta P$ of the regenerative bed element R per unit length, as follows:

$$1/\Delta P \propto de/v^2 \quad (7)$$

Then, if the fluid flow velocity "v", or the formula (4) above, is substituted into that formula (7), we can further define a reciprocal of the pressure loss $\Delta P$ of the regenerative bed element R per unit flow quantity, as follows:

$$1/\Delta P \propto (A_R)^2 \cdot de = (\beta A)^2 \cdot de \quad (8)$$

Then, the pressure loss reciprocal per unit substantially hollow cross-sectional area of the element R is expressed as follows:

$$1/\Delta P \propto \beta^2 \cdot de \propto \beta^2 (P-T) \quad (9)$$

Hence, the reciprocal $1/\Delta P$ may be expressed by $\beta^2(P-T)$.

Accordingly, on the basis of the formulas (1), (2) and (3) above, we can obtain the following expression as an evaluation function or formula for evaluating the above-noted optimal conditions (i), (ii), and (iii).

$$\begin{aligned} f &= (Vc/V) \times (At/V) \times (1/\Delta P) \quad (10) \\ &= (1-\beta) \times \{\beta/(P-T)\} \times (P-T)\beta^2 \\ &= (1-\beta) \times \beta^3 \end{aligned}$$

Namely, when the formula (10) gives a maximum value, the conditions (i), (ii), and (iii) become optimal or best. Thus, turning back to the cell pitch P and cell wall thickness T, the inventor considered a relation between those two cell factors and the foregoing formula (10) under the state where formula (10) gives a maximum value. Specifically, as shown in FIG. 3, by setting values of P/T ratio (i.e. a ratio between the cell pitch P and cell wall thickness T) along the axis of abscissas x and setting the corresponding values of the formula f (10) along the axis of ordinate y, it is possible to draw the graph of the function by calculating the formula f.

Figure 3:
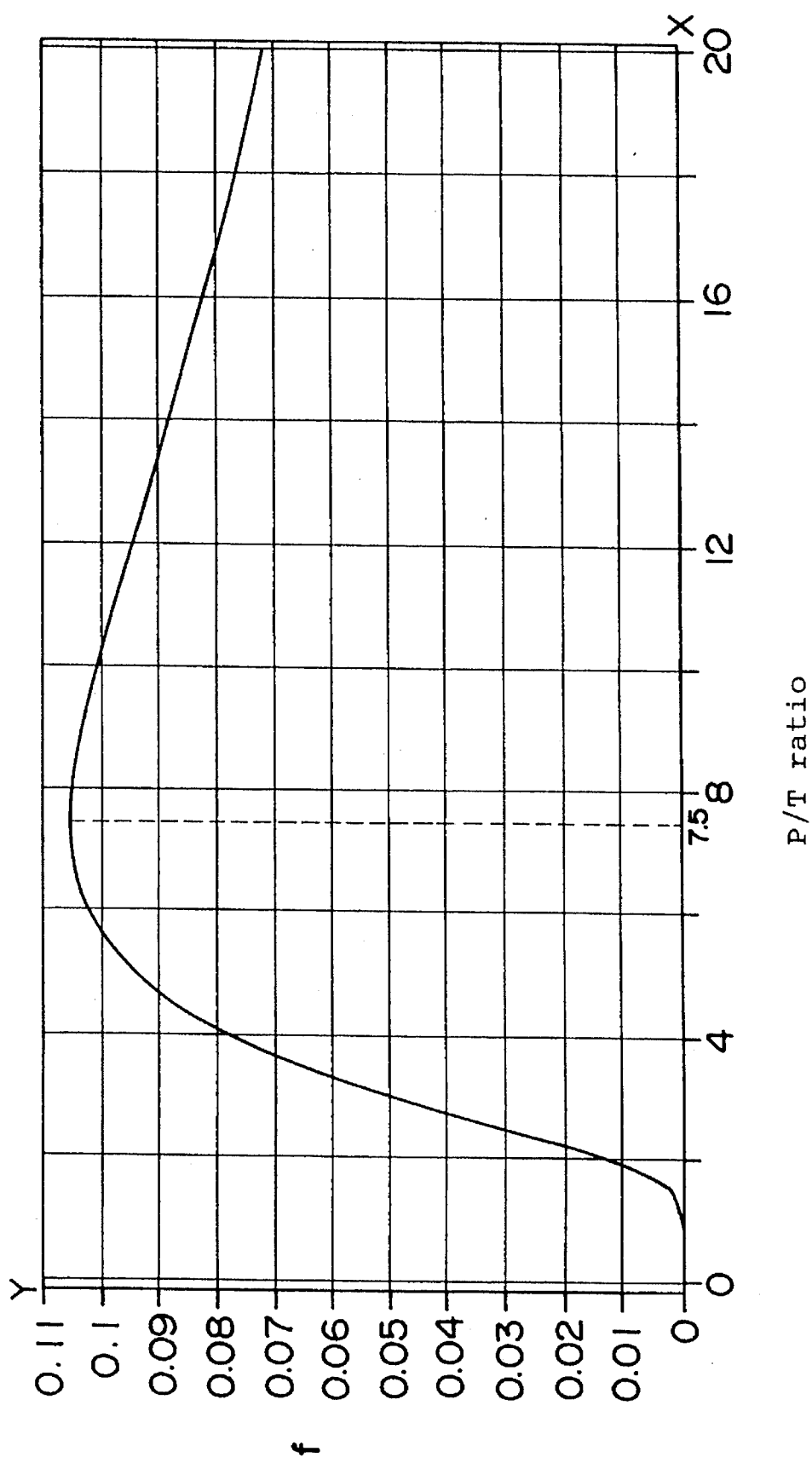
FIG. 3 is a graph which shows a relation among a value of formula f, a thickness of cell wall and a cell pitch for the purpose of featuring the honeycomb-like regenerative bed element.

From the graph in FIG. 3, it is seen that the function or formula f gives a maximum value when the P/T ratio is 7.5. Accordingly, if a certain value of T (i.e. cell wall thickness) is determined, a corresponding value of P (i.e. cell pitch) may be obtained by multiplying that value of T by 7.5, whereupon all the optimal conditions (i), (ii), and (iii) may be satisfied for the regenerative bed element R. It is also understood that, insofar as the P/T ratio falls within the range of 5 to 10, good conditions close to those three optimal conditions may be achieved.

Preferably, mullite or cordierite ceramics may be used for the ceramics material of the regenerative bed element R.

In accordance with the present invention, therefore, it is appreciated that a desired shape of cells can be formed in the regenerative bed element R on the basis of a ratio between the cell pitch and cell wall thickness, as can be seen from FIGS. 2(A), 2(B) and 2(C) for example, and that the feature of the present invention resides in the relation between the cell pitch P and cell wall thickness T of the regenerative bed element R, not in the shape of both regenerative bed element R and the cells therein. :

What is claimed is:

1. A honeycomb regenerative bed element for a waste heat recovery system of a combustion device, the element having a large number of cells, and being structured so that the following function f is attained:

$$f=(1-\beta)\beta^3$$

wherein $\beta$ is an opening ratio of said regenerative bed element, $$\beta=(P-T)^2/P^2$$

P is a pitch of said cells, which is a distance between one center of gravity in one cell and another center of gravity in another cell, said distance extending across a common cell wall and perpendicular thereto, and T is a thickness of wall of each of said cells, said P and said T being set to be at least close to a maximum value obtained by said function f.

2. The honeycomb regenerative bed element as defined in claim 1, wherein a P/T ratio, that is, a ratio between said P and T, is set within a range of values from 5 to 10 on basis of said function f.

3. The honeycomb regenerative bed element as defined in claim 1, wherein a P/T ratio, that is, a ratio between said P and T, is 7.5 on basis of said function f.

4. The honeycomb regenerative bed element as defined in claim 1, which is formed from a ceramics material.

* * * * *